United States Patent
Sakoske et al.

(10) Patent No.: US 9,487,435 B2
(45) Date of Patent: Nov. 8, 2016

(54) LASER MARKING COMPOSITIONS AND RELATED METHODS

(71) Applicant: FERRO CORPORATION, Mayfield Heights, OH (US)

(72) Inventors: George E. Sakoske, Independence, OH (US); Joseph E. Sarver, Washington, PA (US); Dennis R. Gilmore, Washington, PA (US); Stephen Rozwood, Castle Shannon, PA (US); Sean T. Weir, Bridgeville, PA (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 14/391,423

(22) PCT Filed: Jul. 25, 2013

(86) PCT No.: PCT/US2013/051927
§ 371 (c)(1),
(2) Date: Oct. 9, 2014

(87) PCT Pub. No.: WO2014/025539
PCT Pub. Date: Feb. 13, 2014

(65) Prior Publication Data
US 2015/0125626 A1    May 7, 2015

Related U.S. Application Data

(60) Provisional application No. 61/680,793, filed on Aug. 8, 2012.

(51) Int. Cl.
| | | |
|---|---|---|
| *C09D 11/037* | (2014.01) | |
| *C09D 11/50* | (2014.01) | |
| *C03C 17/00* | (2006.01) | |
| *C04B 41/85* | (2006.01) | |
| *C04B 41/00* | (2006.01) | |
| *C04B 41/45* | (2006.01) | |
| *C23C 18/06* | (2006.01) | |
| *C23C 18/14* | (2006.01) | |
| *B23K 26/06* | (2014.01) | |
| *C23C 18/08* | (2006.01) | |
| *C23C 18/12* | (2006.01) | |
| *C04B 41/50* | (2006.01) | |
| *B23K 26/00* | (2014.01) | |
| *B23K 26/36* | (2014.01) | |
| *B41M 5/26* | (2006.01) | |
| *C04B 111/80* | (2006.01) | |

(52) U.S. Cl.
CPC ......... *C03C 17/007* (2013.01); *B23K 26/0006* (2013.01); *B23K 26/0661* (2013.01); *B23K 26/342* (2015.10); *B23K 26/362* (2013.01); *C04B 41/009* (2013.01); *C04B 41/4572* (2013.01); *C04B 41/50* (2013.01); *C04B 41/85* (2013.01); *C09D 11/037* (2013.01); *C09D 11/50* (2013.01); *C23C 18/06* (2013.01); *C23C 18/08* (2013.01); *C23C 18/1216* (2013.01); *C23C 18/14* (2013.01); *B23K 2201/007* (2013.01); *B23K 2203/50* (2015.10); *B41M 5/262* (2013.01); *C03C 2217/29* (2013.01); *C03C 2218/32* (2013.01); *C04B 2111/80* (2013.01)

(58) Field of Classification Search
CPC ........ C09D 11/02; C09D 11/03; C09D 11/50
See application file for complete search history.

(56) References Cited

U.S. PATENT DOCUMENTS

| | | | |
|---|---|---|---|
| 4,769,310 A | 9/1988 | Gugger et al. | |
| 5,422,383 A * | 6/1995 | Takahashi | B41M 5/267 428/403 |
| 6,028,134 A * | 2/2000 | Zhang | C08K 3/22 522/2 |
| 6,238,847 B1 * | 5/2001 | Axtell, III | B41M 5/262 427/555 |
| 6,313,436 B1 | 11/2001 | Harrison | |
| 6,680,121 B2 | 1/2004 | Sakoske et al. | |
| 7,485,403 B2 | 2/2009 | Khan | |
| 8,172,935 B2 | 5/2012 | Swiler et al. | |
| 2012/0213943 A1 | 8/2012 | Sarver et al. | |

OTHER PUBLICATIONS

Espacenet bibliographic data for JPH04210882 published Jul. 31, 1992, one page.
Espacenet bibliographic data for JPS6330289 published Feb. 8, 1988, two pages.
International Search Report for corresponding PCT/US2013/051927 mailed Nov. 7, 2013, two pages.

* cited by examiner

*Primary Examiner* — Veronica F Faison
(74) *Attorney, Agent, or Firm* — Rankin, Hill & Clark LLP

(57) ABSTRACT

Various laser marking compositions and related methods are described. The laser marking compositions utilize one or more populations of particles having certain average particle sizes or a range of sizes. Marks or other indicia formed using the compositions and methods exhibit increased contrast, improved substrates bonding, and greater dispersability.

15 Claims, No Drawings

LASER MARKING COMPOSITIONS AND RELATED METHODS

FIELD

The present subject matter relates to compositions for use in laser marking operations and various methods of laser marking using such compositions. The present subject matter also relates to articles marked using the noted compositions and/or methods.

BACKGROUND

Laser marking is a marking technique that uses lasers and other forms of radiant energy to bond an additive marking substance to a wide range of substrates. Laser marking forms permanent marks on metals, glass and ceramic parts and is used in many applications, ranging from aerospace to awards and engraving industries. Laser marking differs from the more widely known techniques of laser engraving and laser ablation in that laser marking is an additive process, adding material to the substrate to form the marking instead of removing material as in those techniques.

For metal substrates, parts can be permanently marked with high contrast, high resolution marks for logos, barcoding, and identification and serialization purposes without damage to the substrate. With glass and ceramics, complex surfaces can be decorated or marked and the traditional firing process replaced by a laser and a marking composition with a permanent bond of the composition and surface being formed in seconds.

Although satisfactory in many regards, a need remains for marks that exhibit increased contrast and marks that are more readily visible. In addition, for marks subjected to surface wear, abrasion or exposure to environmental factors, it would also be beneficial to improve bonding between the mark and the underlying substrate to prevent or reduce the potential for wearing or removal of the mark. Furthermore, certain marking compositions when provided in liquid form, exhibit poor stability and thus tend to separate into multiple phases. Thus, frequent mixing and agitation of the composition is necessary and particularly prior to and during application. Accordingly, in view of these and other concerns, a need exists for improved marking compositions and methods using such materials.

SUMMARY

The difficulties and drawbacks associated with previously known materials and practices are addressed in the present compositions and methods for laser marking.

In one aspect of the present subject matter, laser marking compositions for use on glass substrates are provided that produce high contrast markings, i.e. marks or indicia. The composition comprises at least one solvent or carrier, at least one absorber compound selected from the group consisting of complex inorganic compounds, zirconium compounds, silicon compounds, calcium compounds, and combinations thereof. The at least one absorber compound has an average particle size between about 0.1 microns to about 10.0 microns.

In another aspect of the present subject matter, laser marking compositions for use on ceramic substrates are provided that produce high contrast markings. The composition comprises at least one solvent or carrier, at least one absorber compound selected from the group consisting of complex inorganic compounds, zirconium compounds, silicon compounds, and combinations thereof. Additional absorber compounds of the present subject matter for ceramic substrates include metal oxides (ex. cobalt oxide, tungsten oxide, iron oxide, aluminum oxide, chromium oxide, lead oxide, lead chromium oxide, lead sulfur oxide, bismuth vanadium oxide, manganese iron oxide, titanium oxide, etc), metal compounds (ex. copper, silver, gold, etc.), inorganic pigments (ex. cobalt aluminates, carbon black, stannic sulfide, cadmium selenide, etc.), inorganic pigment precursors, and combinations thereof. The at least one absorber compound has an average particle size between about 0.1 microns to about 10.0 microns.

In another aspect of the present subject matter, laser marking compositions for use on metal substrates are provided that produce high contrast markings. The composition comprises at least one solvent or carrier, at least one absorber compound selected from the group consisting of molybdenum compounds, vanadium compounds, silicon compounds, and combinations thereof. The at least one absorber compound has an average particle size between about 0.1 microns to about 10.0 microns.

In yet another aspect of the present subject matter, a method is provided of using laser marking compositions to produce high contrast markings on substrates. The method comprises provided a substrate. The method also comprises providing a composition that includes at least one solvent or carrier and at least one absorber compound selected from the group consisting of complex inorganic compounds, zirconium compounds, silicon compounds, calcium compounds, molybdenum compounds, vanadium compounds, and combinations thereof; wherein the at least one absorber compound has an average particle size between about 0.1 microns to about 10.0 microns. The method also comprises disposing the composition to at least a portion of the substrate to form a coating on the substrate. The method also comprises irradiating at least a portion of the coating with laser light such that regions of the coating increase in temperature, at least partially adhere to the substrate, and form a marking on the substrate that has a luminance that differs from the luminance of the substrate. And the method additionally comprises removing any remaining composition from the substrate after irradiation.

As will be realized, the present subject matter is capable of other and different embodiments and its several details are capable of modifications in various respects, all without departing from the present subject matter. Accordingly, the drawings and description are to be regarded as illustrative and not restrictive.

DETAILED DESCRIPTION OF THE EMBODIMENTS

The present subject matter provides various compositions, methods, and articles marked using the noted compositions and methods. The compositions comprise one or more populations of absorber particles having particular sizes. In accordance with the present subject matter, it has been discovered that certain aspects of the resulting marks can be significantly improved or enhanced by selection and use of marking compositions having particles with certain size characteristics.

For example, surface bonding between the particles and the substrate can be enhanced by use of the compositions having particles with particular size characteristics. Generally, a stronger bond results if particles of a particular size are used for a particular substrate. In addition, using particles having the size characteristics described herein results in marking compositions having improved dispersion properties, i.e. the particles tend to remain dispersed in a liquid carrier for relatively long periods of time. In addition, use of the compositions in accordance with the present subject matter having the particle size characteristics described herein increases the contrast of marks produced by laser marking. That is, by use of the described particle size characteristics, an increase in contrast in laser formed marks can be achieved, and generally at lower laser energies. These and other advantages and benefits are described in greater detail herein.

Marking Compositions

As used herein, the term "marking composition" means a compound that can be disposed on a substrate and provide a contrasting mark on the substrate after the region has been irradiated by a laser. The resultant marked region contrasts with the non-irradiated region of the substrate, e.g., the marking may have a different luminance/lightness value and/or color value on the Hunter Lab scale as compared with the non-irradiated region.

In the Hunter Lab scale, also CIELAB scale (so named for the variables L, a, and b), L measures luminance or lightness and varies from 100 for perfect white to zero for black, approximately as the eye would evaluate it. Where DL=L (sample)−L (standard). If DL (which can also be expressed as $\Delta L$) is positive, the sample is lighter than the standard. If DL is negative, the sample is darker than the standard.

The chromaticity dimensions (a and b) give understandable designations of color. The a dimension measures redness when positive, gray when zero, and greenness when negative. Where Da=a(sample)−a(standard). If Da (or $\Delta a$) is positive, the sample is redder than the standard. If Da is negative, the sample is greener than the standard.

The b dimension measures yellowness when positive, gray when zero, and blueness when negative. Where Db=b (sample)−b(standard). If Db (or $\Delta b$) is positive, the sample is yellower than the standard. If db is negative, the sample is bluer than the standard.

The Hunter total color difference (DE or $\Delta E$) for any illuminant or observer is calculated as $\Delta E = \sqrt{(\Delta L^2 + \Delta a^2 + \Delta b^2)}$.

In one embodiment of the present subject matter, the marking composition provides contrasting marks having different lightness values (L) as compared with the substrate lightness value (L), providing a lightness value difference $\Delta L$ between that of the substrate and that of the irradiated marking composition as determined by the standard CIELAB scale. In another embodiment, the metal marking compositions provide contrasting marks having different color values (a and b) than the substrate. In still another embodiment, the ceramic marking compositions provide optimum color characteristics having certain degrees of opaqueness to cover the marked portion of the substrate and provided contrast with the remaining portion of the substrate. In yet another embodiment, the glass marking compositions provided lightness values, color values, degrees of transparency, translucence, opacity, and combinations thereof to provide contrast from the unmarked portion of the substrate.

The resulting laser markings made in accordance with the present subject matter may need to be opaque for one application (such as in ceramic applications), while another application may require transparency or translucency to show a certain effect on the substrate. The difference in lightness values $\Delta L$ between the marked and unmarked regions typically has an absolute value of greater than about 10 as measured with a CIE D65 illuminant at 10 degrees. The absolute value of $\Delta L$ is greater than about 20 in one embodiment, or greater than about 25 in another embodiment. In a particular embodiment, the absolute value of $\Delta L$ is about 30 or higher. The laser markings made in accordance with the present subject matter and corresponding L, a, and b values for those markings are measured with a spectrophotometer using a CIE D65 illuminant at 10 degrees.

The opacity or opaqueness of a glass marking composition can be measured with a spectrophotometer over a black and white Leneta card. In one embodiment, the contrast measured over black and then white Leneta backgrounds for the opacity of a marking composition is from about 1 $\Delta E$ to about 5 $\Delta E$ and in another aspect from about 0.5 $\Delta E$ to about 2 $\Delta E$.

The present subject matter marking compositions generally comprise (i) one or more populations of absorber particles having particular size characteristics, (ii) a carrier or solvent, and (iii) one or more optional additives. The compositions are not limited to (i), (ii), and (iii), and can include additional components in accordance with the present subject matter.

The marking compositions made in accordance with the present subject matter can be formulated in ways that makes them suitable for one of many application techniques depending upon the particular requirements of the final marking process. For example, the marking compositions may be incorporated into a powder, a tape or a liquid medium. The marking compositions can be applied via a variety of means including but not limited to screen printing, spraying and electronic deposition using such application techniques as ink jet and valve jet application.

Preparation of the marking composition in liquid form can, for example, occur through low shear mechanical mixing, high shear mechanical mixing, ultrasonic mixing and/or milling, or the like.

Depending upon the type of application technique, the components of the marking compositions will vary. Below in table 1 are illustrative examples of the range of components employed for a marking composition in accord with the present subject matter.

TABLE 1

Range of Components and Typical Weight Percentages

| Component | Typical Weight Percent |
| --- | --- |
| Carrier or Solvent (Typically Water and/or Alcohol) | 30-60% |
| Glass Frit or Frit Precursor | 15-45% |
| Resin Binder | 0.25% to 5% |
| Absorber Particles | 1% to 25% |
| Dispersant/Surfactant | 0 to 5% |
| Silicate minerals | 0 to 10% |

Variations from these typical weight percentages are within the scope of the present subject matter. For example, if a tape is being produced, the marking composition may comprise a considerable amount of binder, for example, 50% by weight. However, if a powder is being formed, such powder may be free of binder. Similarly, if a liquid application technique is being used, a considerable amount of carrier may be utilized, whereas with a powder, little or no carrier would be employed. In an alternate embodiment, 25 to 45 wt % of at least one carrier may be used.

The durability of the laser marks was tested for metal, glass, and ceramic applications. The marking compositions were applied to a substrate, allowed to dry, and irradiated with a laser. Excess marking material, not bonded to the substrate, was washed from the substrate. A Scotch-Brite Heavy Duty Scrub Sponge with yellow sponge side and green scouring side, provided by 3M Corporation, 3M Center, St. Paul, Minn. 55144-4000 was wetted with water. The green scouring side was used to scour the marks and then compared to a standard laser mark. Equal pressure and time were used for scouring all marks and then visually compared for pass/fail analysis.

Solvent or Carrier

In accordance with the present subject matter one or more solvents or carriers are incorporated for transferring the absorber particles. The solvents or carriers comprise water or other aqueous-based liquids, or one or more organic solvents. If water is selected as the carrier, the water can be purified water. Examples of purified water include but are not limited to distilled water and de-ionized (DI) water.

Non-limiting examples of other solvents or carriers include alcohols such as ethanol. Non-limiting examples of organic solvents include ketones, alkanes such as butane (such as if in liquid form as a result of pressurization such as may be used for spray applications), and aromatic organic solvents such as xylenes.

In accordance with the present subject matter, the marking compositions may include carriers such as water, alcohols, polyols, chlorinated solvents, amines, esters, glycol ethers, ketones, terpenes, petroleum naphthas, aromatic hydrocarbons and natural oils. Other suitable carriers include furans, isoparaffins, N,N dimethylformamide, dimethylsulfoxide and tributylphosphine.

Glass Frit or Frit Precursor

In accordance with the present subject matter, a marking composition is applied to the surface of a substrate. The applied marking composition may comprise glass frit such as lead or lead-free frit. As used herein, the term "glass frit" means pre-fused glass material which is typically produced by rapid solidification of molten material followed by grinding or milling to the desired powder size. Finely ground glass materials are suitable for marking glass or ceramic substrates. Glass frits generally are composed of alkali metal oxides, alkaline earth metal oxides, silica, boric oxide and transition metal oxides.

In accordance with the present subject matter, glass frits generally are composed of alkali metal oxides, alkaline earth metal oxides, silica, boric oxide and transition metal oxides. In one embodiment, glass frits may comprise from 0 to about 75 weight percent lead oxide, from 0 to about 75 weight percent bismuth oxide, from 0 to about 75 weight percent silica, from 0 to about 50 weight percent zinc oxide, from 0 to about 40 weight percent boron oxide, from 0 to about 15 weight percent aluminum oxide, from 0 to about 15 weight percent zirconium oxide, from 0 to about 8 weight percent titanium oxide, from 0 to about 20 weight percent phosphorous oxide, from 0 to about 15 weight percent calcium oxide, from 0 to about 10 weight percent manganese oxide, from 0 to about 7 weight percent copper oxide, from 0 to about 5 weight percent cobalt oxide, from 0 to about 15 weight percent iron oxide, from 0 to about 20 weight percent sodium oxide, from 0 to about 20 weight percent potassium oxide, from 0 to about 15 weight percent lithium oxide and from 0 to about 7 weight percent fluoride, as well as other oxides conventionally used in glass frit compositions.

In addition to glass frit, precursors of such glass frit materials may be used for the marking compositions. Examples of glass frit precursors include metal oxides with glass formers, such as silica, zinc oxide, bismuth oxide, sodium borate, sodium carbonate, feldspars, fluorides, and the like.

Resin Binder

The marking compositions of the present subject matter may comprise amounts of binder materials to improve rheological properties, green strength, or package stability for the compositions. Additions may include epoxies, polyesters, acrylics, cellulosics, vinyls, natural proteins, styrenes, polyalkyls, carbonates, rosins, rosin esters, alkyls, drying oils, and polysaccharides such as starches, guar, dextrins and alginates, and the like.

Absorber Particles

Absorber particles as used herein, refer to particles that absorb radiant energy and bond with the substrate to form a marking on the substrate with luminance, color values, or degrees of opacity that provide visual contrast with the substrate.

In accordance with the present subject matter, the compositions comprise any of a number of absorber particles. The compositions of absorber particles comprise but are not limited to complex inorganic compounds, zirconium compounds, silicon compounds, calcium compounds, molybdenum compounds, vanadium compounds, bismuth containing oxide compounds, and combinations thereof. Additional absorber particles include metal oxides, metal compounds, inorganic pigments, inorganic pigment precursors, and combinations thereof. Non-limiting examples of metal oxide absorber particles include cobalt oxide, tungsten oxide, iron oxide, aluminum oxide, chromium oxide, lead oxide, lead chromium oxide, lead sulfur oxide, bismuth vanadium oxide, molybdenum oxide, manganese iron oxide, titanium oxide, etc. Non-limiting examples of metal compounds include copper compounds, silver compounds, gold compounds, etc. Non-limiting examples of inorganic pigments include cobalt aluminates, carbon black, stannic sulfide, cadmium selenide, etc. Non-limiting examples of complex inorganic compounds include inorganic pigments and oxides. Non-limiting examples of zirconium compounds include zirconium silicates-oxides. Non-limiting examples of silicon compounds include phyllosilicate minerals.

The absorber particles of the present subject matter have particular size characteristics. More specifically, various size ranges are noted for the average particle size of particles in the compositions. The size of a particle is the maximum span of a particle. In describing the size characteristics, particles are described in terms of average or mean size. When referring to average or mean size, it is meant the $D_{50}$ value on a volume basis, wherein the particles having a size greater than the $D_{50}$ value comprise half of the volume of total particles; and the particles having a size less than the $D_{50}$ value make up the other half of the volume of total particles. For particles that are spherical in shape, the maximum span is the diameter of the particle. However, it will be understood that the particles may be in a variety of different shapes besides spherical. Non-limiting examples of particle shapes include flake or leaf shaped, oblong, triclinic, monoclinic, isomeric, tetragonal, hexagonal, trigonal, cubic, polymorphic, or other shapes. And so, for non-spherical particles, their maximum span is the maximum distance from one location on the particle. The maximum distance is typically measured through the particle as this is a straight line distance.

In many of the compositions described herein, multiple populations of particles are provided. For example, a marking composition may include a first particulate material, a second particulate material, and still additional particulate materials. In the examples described herein, an average or mean particle size of multiple populations of particles is referenced.

The present subject matter provides for particle sizes that are optimized to provide high contrast with the substrate to which they are applied. Also provided are particle sizes to optimize surface bonding between the particles and the substrate. This optimization results in a more durable bond between the marking compositions and the substrate after the marking compositions are irradiated with a laser. An additional benefit of optimizing particle size is provided to improve dispersion characteristics of particles in the marking compositions. This provides for longer shelf-life of a marking composition and reduces agglomeration, sedimentation, aggregation, flocculation, or the like.

The size of the absorber particles can be adjusted in any number of ways well known in the art including grinding, pulverizing, hammering, milling and the like that can be accomplished with horizontal mills, paint shakers, ball mills and the like.

In one embodiment the present subject matter provides for marking compositions for use in marking glass substrates with absorber compounds comprising particles of complex inorganic compounds, zirconium compounds, silicon compounds, calcium compounds or combinations thereof. In one aspect, the particles have an average particle size from about 0.1 microns to about 10.0 microns; in another aspect from about 4 to about 6 microns. Additional absorber particles including metal oxides, metal compounds, inorganic pigments, and inorganic pigment precursors, or combinations thereof are provided with an average particle size in one aspect from about 0.1 microns to about 10.0 microns, and in another aspect from about 4 microns to about 6 microns.

In another embodiment the present subject matter provides for marking compositions for use in marking ceramic substrates with absorber compounds comprising particles of complex inorganic compounds, zirconium compounds, silicon compounds, metal oxides, metal compounds, inorganic pigments, inorganic pigment precursors, or combinations thereof; in one aspect with an average particle size from about 0.1 microns to about 10.0 microns, and in another aspect from about 3 microns to about 5 microns or from about 0.8 microns to about 4 microns depending on the application process.

In another embodiment the present subject matter provides for marking compositions for use in marking metal substrates with absorber compounds comprising particles of molybdenum compounds, vanadium compounds, silicon compounds, or combinations thereof. In one aspect, the average particle size of the absorber compounds is from about 0.1 microns to about 10.0 microns; and in another aspect from about 1 micron to about 10 microns or from about 5 microns to about 10 microns depending on the application process.

Dispersant/Surfactant

Surfactants or dispersants aid in coating the absorber particles and, in combination with particle size optimization, inhibits coalescing or clumping of the particles. If the particles are subjected to a particle size reduction operation, the dispersant can be added during size reduction to inhibit the particles from aggregating together to form larger bodies.

Examples of suitable surfactant/dispersants include but are not limited to Nuosperse AQ-200 supplied by Elementis Specialties, Inc., 469 Old Trenton Road, East Windsor, N.J. 08512 or other hydrophobic humectant with water resistant and scrub resistant properties can be used. Generally, any surface active dispersant, silicon based dispersant, etc., may be suitable for use in the compositions. Non-polymeric and polymeric surface active dispersants, surfactants or agents can be incorporated into the formula.

Silicate Mineral

In addition to other components, a silicate mineral(s) is optionally added to the marking compositions to adjust the rheological properties of the marking compositions and to provide durability for the laser markings. Non-limiting examples of silicate minerals that can be used in accordance with the present subject matter include phyllosilicates selected from the serpentine group, the clay mineral group, the mica group, and the chlorite group.

Additional Components

The marking compositions may optionally include additives generally known in the art to improve dispersability, wetting, flow and rheology, and to relieve surface defects.

The present subject matter marking compositions incorporate these additional components depending on the intended application. Non-limiting examples of typical additives include phyllosilicates, resin binders, glass frits, glass frit precursors, metal oxides, metals, fluxes, oxidizers, reducers, dispersants, surfactants, coloring agents, viscosity adjusting agents, flow controllers, stabilizers, co-solvents such as alcohols, and clarity promoters to promote maintenance of optical characteristics of the marking compositions. As noted, the use of one or more additives in the marking composition(s) is optional.

Specific Marking Compositions

The marking compositions can be classified according to the type of substrate to be laser marked. That is, one type of composition is a glass marking composition. Another composition is a ceramic marking composition. Yet, another composition is a metal marking composition. Each of these compositions is discussed herein.

Glass Marking Compositions

In glass applications in accordance with the present subject matter, opacity, color values (a and b) and contrast (L value) of the mark from the substrate are all properties of the mark that are considered in accordance with the present subject matter. The application will dictate whether opacity, color, contrast or combinations of these properties are important.

By glass it is meant lead as well as lead-free glasses such as soda lime silicates, borosilicates, aluminum silicates, fused silica and the like. Transparency, translucency and opacity of the marking compositions depend on an optimum particle size for the absorber particles. For laser marking on certain glass substrates the resulting mark may need to be opaque for one application, while another glass application may require transparency or translucency when laser marked to show a certain effect through the glass. By optimizing the particle size distribution, the transparency, translucency and opacity of the compositions, the finished laser marked sample is affected.

In one embodiment, the glass marking compositions utilize (i) one or more populations of absorber particles, (ii) a carrier, and (iii) one or more optional additives. Regarding the absorber particles, non-limiting examples of materials and concentrations include from about 10% to about 50% of complex inorganic compounds, from about 5% to about 25% of zirconium compound(s), from about 1% to about 10% of silicon compounds, and/or from about 1% to about 12% of calcium compounds. Suitable complex inorganic compounds include inorganic pigments and oxides. Suitable zirconium compounds include zirconium silicates and oxides. Suitable silicon compounds include phyllosilicate minerals. Suitable calcium compounds include calcium oxides and carbonates.

In another embodiment of the invention, the absorber compound comprises from about 10 wt % to about 50 wt % of the complex inorganic compounds; from about 5 wt % to about 30 wt % of the zirconium compounds; from about 5 wt % to about 25 wt % of the silicon compounds; and ram about 5 wt % to about 25 wt % of the calcium compounds.

Typically, the size of the absorber particles in the glass marking composition ranges from about 0.1 to about 10.0 microns, and optionally from about 4 to about 6 microns. In one embodiment, the shape of the absorber particles in the glass marking compositions is of spinel structure; however, the present subject matter includes additional shapes such as inverse spinel. Absorber particles such as inorganic pigments and pigment precursors can be triclinic, monoclinic, cubic, isomeric, tetragonal, hexagonal, trigonal, etc. and in some cases polymorphic.

In one embodiment, the carrier for the glass marking compositions is ethanol, water, acetone, methyl ethyl ketone and combinations thereof.

Ceramic Marking Compositions

In ceramic applications in accordance with the present subject matter, opacity and the color values (a and b) have more affect on the contrast of the mark from the substrate than does the lightness (L) value of the mark. This is due to the mark becoming more opaque and masking the ceramic tile.

By "ceramic materials" it is meant inorganic, non-metallic, high-melting materials that are usually referred to in the literature as clay ceramics and special ceramics. Examples thereof are oxides in crystalline or glassy form, e.g. alkali metal or alkaline earth metal aluminosilicates or aluminoborates, as well as non-oxides such as carbides, nitrides, and silicides. Typical ceramic substrates include tiles, sanitary ware, stoneware bodies, porcelain bodies and bricks, as well as electronic quality ceramic substrates such as silica, alumina, aluminum nitride, etc.

In one embodiment, the ceramic marking compositions utilize (i) one or more populations of absorber particles, (ii) a carrier, and (iii) one or more optional additives. Regarding the absorber particles, non-limiting examples of materials and concentrations include from about 10% to about 50% of complex inorganic compounds, from about 5% to about 30% of zirconium compound(s), and/or from about 5% to about 25% of silicon compound(s). In one embodiment, complex inorganic compounds are inorganic pigments and oxides. In one embodiment, zirconium compounds are zirconium silicates and oxides. In one embodiment, silicon compounds are phyllosilicate minerals.

Additional absorber groups include metal oxides, inorganic pigments, inorganic pigment precursors, and combinations thereof. Non-limiting examples of metal oxide absorber particles include complex inorganic compounds, tungsten oxide, iron oxide, aluminum oxide, chromium oxide, lead oxide, lead chromium oxide, lead sulfur oxide, bismuth vanadium oxide, molybdenum oxides, manganese iron oxide, titanium oxide, etc. Non-limiting examples of metal compounds include copper compounds, silver compounds, gold compounds, etc. Non-limiting examples of inorganic pigments include cobalt aluminates, carbon black, stannic sulfide, cadmium selenide, etc.

In one embodiment, the ceramic marking compositions also comprise glass frit; one or more complex inorganic metal oxides such as complex inorganic blue, black, red, yellow, green, brown, and orange metal oxides, a metal oxide opacifier; and water as a carrier. The glass frit is used in a concentration of from about 10 wt % to about 50 wt %, and alternatively from about 20 wt % to about 40 wt %. The complex inorganic metal oxide component is used at a concentration of from about 5 wt % to about 40 wt %, and most optionally from about 10 wt % to about 30 wt %. The metal oxide opacifier is used at a concentration of from about 3 wt % to about 30 wt %, and alternatively from about 5 wt % to about 25 wt %. Non-limiting examples of metal oxide opacifiers are $CeO_2$, $SnO_2$, $TiO_2$, and zirconium compounds. The carrier is used at a concentration from about 10 wt % to about 65 wt %, and alternatively from about 30 wt % to about 60 wt %.

Typically, the size of the absorber particles in ceramic marking compositions ranges from about 0.1 to about 10.0 microns, and alternatively from about 0.8 to about 5 microns. The particle size depends upon the type and/or the marking composition used for marking. For example in one embodiment, when using a 10 watt non-pulsed fiber laser, particles having a size of from about 2 microns to about 5 microns are used. And in another embodiment, when using a 30 watt $CO_2$ laser, particles having a size from about 0.08 to about 4 microns are used. The shape of the absorber particles in the ceramic marking compositions is spinel in one embodiment, however, the present subject matter includes additional shapes such as inverse spinel. Absorber particles such as inorganic pigments and pigment precursors can be triclinic, monoclinic, cubic, isomeric, tetragonal, hexagonal, trigonal, etc. and in some cases polymorphic.

Metal Marking Compositions

By metals it is meant metals, ferrous and non-ferrous, which can be pure elemental metals, alloys, and include coatings or plating layers having similar properties.

In one embodiment, the metal marking compositions utilize (i) one or more populations of absorber particles, (ii) a carrier, and (iii) one or more optional additives. The absorber particles comprise molybdenum compound(s), vanadium compound(s), silicon compound(s), and combinations thereof.

Typically, the size of the absorber particles in the metal marking composition ranges from about 0.1 to about 10.0 microns. Particles with average particle size from about 5 microns to about 10 microns are used for marking with a 10 watt non-pulsed fiber laser and from about 1 micron to about 10 microns for use with a 35 watt $CO_2$ laser.

Metal marking compositions comprise molybdenum compounds, silicon compounds, and vanadium compounds. The component absorber particles are used in concentrations as follows: from about 3 wt % to about 80 wt % molybdenum compounds, preferably from about 10 wt % to about 50 wt % of molybdenum compounds, from about 5 wt % to about 25 wt % vanadium compounds, and from about 3 wt % to about 20 wt % silicon compounds. In one embodiment, a silicon compound is a phyllosilicate mineral. Examples of phyllosillicate minerals are those in the serpentine group, the clay mineral group, the mica group, and the chlorite group.

In one embodiment, the metal marking compositions additionally comprise one or more metal oxides from about 5 wt % to about 50 wt %, alternatively from about 15 wt % to about 35 wt %; silicon compounds from about 3 wt % to about 20 wt %; and metal salts from about 2 wt % to about 10 wt % alternatively about 3 wt % to about 7 wt %.

The carrier comprises one or more alcohols and/or water. In one aspect, the absorber particles are combined with about 20 wt % to about 80 wt % ethanol as a carrier.

Regardless of the type of composition or ultimate use intended for the composition, the compositions can be prepared by conventional blending and mixing techniques. The absorber particles can be subjected to one or more size reduction operations to obtain a desired average particle size or range of average particle sizes.

In the previously described glass marking compositions, ceramic marking compositions, and metal marking compositions; one or more populations of absorber particles are used.

Methods

Generally, mark quality depends on a variety of factors, including the substrate used, marking speed, laser spot size, beam overlap, materials thickness, and laser parameters. The marking compositions may be applied to the substrate by various methods including a brush on technique, masking, dosing, deposition, dispensing, coating, metering, painting, spraying, pad printing, screen printing, roll coating, tape, and others.

The marking processes generally comprise three operations. One operation involves application of the marking composition to a substrate. Another operation involves bonding of the marking composition to the substrate with a laser. And, still another operation involves removal of excess, unbonded material from the substrate.

In accordance with the present subject matter, a selected portion of the marking material is permanently adhered to the substrate upon irradiation. As used herein, the term "adhere" is used to designate any permanent means of attachment of the irradiated marking material to the substrate. For example, the irradiated marking material may be adhered to the surface of the substrate by sintering the marking material to the substrate, fusing the marking material to the surface of the substrate, diffusing at least a portion of the marking material into the substrate, reacting the marking material with the substrate, and the like.

As used herein, the term "permanent marking" means a non-temporary marking which, for example, possesses relatively high wear resistance, corrosion resistance and/or fading resistance. While not being bound to any particular theory, it is believed that the interaction of the radiant energy and the marking material results in an inert coating mechanically and chemically bonded to the substrate material. The marking layer is believed to form covalent bonds with the substrate material, and it is believed this chemical bond exceeds the strength of the mechanical bond.

Upon bonding of the marking composition to the substrate by exposure or irradiation by the laser, the resulting marking composition is fused to the substrate, and in most cases the marking composition is as durable as the substrate itself.

Use of and/or the combination of different compositions of marking composition, second and/or subsequent applications of marking composition and/or the adjustment of laser parameters will result in variations in the durability, appearance, and structural form of the resulting mark and are part of the present subject matter. All of these marking characteristics can be achieved with the use of a single low-power, low-cost air-cooled diode laser. Furthermore, an infinite variety of colors can be achieved.

Application

In a particular aspect, the present subject matter provides transfer marking media for use in the laser marking process. These media include a carrier to which is applied, or into which is incorporated, the necessary marking composition.

The thickness of the resulting coating can be adjusted and/or controlled by the use of viscosity agents in the composition, by the control of temperature, and by using optional treatments or pre-coatings on the surface to be marked. Depending upon the concentration of the coloring agent(s) in the composition and other factors, adjusting the coating thickness can be used to at least partially control contrast or darkness of the markings. Typically, thickness of the coating will vary depending upon coating chemistry and heat stability.

Marking compositions are typically applied to the substrate with a thickness of at least about 0.1 micron, alternatively from about 1 to about 300 microns, or from about 5 to about 200 microns, or from about 10 to about 100 microns.

The present subject matter marking compositions can be disposed on a substrate by different means depending on the requirements for different applications. The characteristics of the laser markings can be tailored in part by altering the components of the marking compositions and in part by selecting the appropriate means or media for applying the marking compositions to a substrate.

In accordance with the present subject matter, the marking compositions are in both solid and liquid form.

In one aspect, the present subject matter comprises a solid marking composition in the form of a powder. Marking compositions in powder form can be brought into contact with the substrate surface at the desired thickness by solvent-less powder deposition, dispensing, coating, metering, dosing, masking, painting or the like.

In another aspect, the present subject matter comprises a marking composition in the form of a liquid. Water based media are used because of their minimal environmental impact, but solvent based media can also be used to control drying rate, dispersion or moisture sensitivity of certain marking materials. In accordance with one embodiment, sol gel materials may be used to apply the marking material to the substrate. Where dispersions are used, the deposited layer can be dried prior to the irradiation step, however this is not necessary. The marking material in liquid form can be applied onto the substrate surface by various methods such as screen printing, painting, flood coating, brushing, spraying, roll coating, dipping, flow coating, electrostatic application and doctor blading.

In one aspect of the present subject matter, marking compositions in liquid form are formulated into a coating composition which is coated onto a carrier surface. The composition can, for example, be in the form of a pressure sensitive adhesive formulation. Alternatively, the marking composition can be, for example, incorporated into the flexible polymer film of the carrier such as polyester, polyethylene, or polypropylene.

These compositions can then be incorporated into a tape and/or label to be disposed on a portion of a substrate. This tape can be in the form of pressure sensitive, slightly self-adhesive labels or a non-adhesive tape pressed against the substrate surface. The tape can be transparent, opaque, or translucent. The label and tape fabrication insure proper and uniform thickness and composition of the marking composition then brought into contact with the substrate surface. Suitable carriers for this type of application strategy are, for example, paper and flexible plastic films such as polyester, polyethylene, and polypropylene films. It is not necessary that a tape or adhesive-carrying film be used. It is also contemplated that nearly any single or multiple film could be used as a carrier for a marking composition so long as the film does not interfere with the marking composition upon application thereto, and laser energy can penetrate the thickness of the film to reach the marking composition and cause marking on the surface of interest.

Additional materials used in the application of the marking composition in liquid form or in the fabrication of tape and/or labels are substantially vaporized into smoke and vented away from the substrate. A laminar air flow across the surface of the substrate can be created by venting and/or exhausting equipment to insure a consistent localized environment in which the process can occur.

In another aspect, marking materials are dispersed in high temperature waxes or polymers and applied to a portion of a substrate from a hot melt or by rubbing the surface of the substrate with such material.

Bonding

After the marking material is applied to the surface of the substrate, a selected portion of the marking material is irradiated with a beam to adhere the irradiated marking material to the substrate and to form a permanent marking thereon. For many types of markings, the selected portion of the marking material to be irradiated may comprise from about 1 to about 99 percent of the total surface area of the layer of marking material, typically from about 5 to about 95 percent. In one embodiment, a laser is used to selectively irradiate the marking material. However, other forms of focused energy may be used in accordance with the present subject matter. Irradiation may be achieved by moving a laser beam over a stationary substrate using conventional beam steering methods, by moving the substrate in relation to the laser beam and/or by masking the substrate. Laser irradiation is typically achieved by directing the beam directly against the layer of marking material, but may also be achieved by directing the beam through a sufficiently transparent substrate.

A wide array of lasers can be used for the present subject matter. Useful lasers for use in the present methods are those known as $CO_2$ lasers and fiber lasers.

A $CO_2$ laser produces a beam of infrared light with the principal wavelength bands centering around 9.4 and 10.6 micrometers. $CO_2$ lasers are available commercially from numerous sources. A suitable $CO_2$ laser is a 35 watt $CO_2$ laser with about 9.2 micron to about 11.4 micron wavelength.

A fiber laser is a laser in which the active gain medium is an optical fiber doped with rare-earth elements such as erbium, ytterbium, neodymium, dysprosium, praseodymium, and thulium. They are related to doped fiber amplifiers, which provide light amplification without lasing. Fiber lasers are also commercially available from numerous sources. A suitable fiber laser is a 10 watt non-pulsed fiber laser with about 904 nm to about 1065 nm wavelength.

Generally, the intensity of the laser and the particular wavelength or ranges of wavelength(s) are selected based upon the characteristics of the composition and the surface to be laser marked. Typical settings for a 35 watt $CO_2$ laser for universal laser markings is from about 2% to about 100% of full power at about 5 to about 100 inches per second speeds. For most coatings, a power level from about 2% to about 35% of full power at about 3 to about 100 inches per second speeds are used. A 10 watt fiber laser can be used from about 3 to 100 inches per second speeds and the power can be from about 1 to about 10 watts. The term "speed" as used herein refers to the velocity of the marking head as it moves across the surface being lased. The marking conditions will vary from one laser to another and achieving a mark is not limited to a particular laser. Changing to a higher or lower watt laser would change the marking parameters, and so one could mark at a lower % power and faster speed or vise versa. The particular combination of power setting, marking speed, and other parameters for the laser of interest can be determined by empirical testing to identify the optimum settings.

The actual power levels as measured at the surface to be marked are slightly different (more or less) than the power measurement of the laser as delivered. As will be appreciated, this is primarily due to the efficiency of the laser tube. A wide array of other lasers can be used such as YAG pulsed lasers, diode lasers, excimer lasers, green lasers, red lasers, UV laser and others.

In accordance with the present subject matter, the size of the laser spot that impinges the marking material is typically greater than 0.1 micron in diameter, alternatively from about 0.1 to about 20 microns, or from about 0.5 to about 10 microns. The speed at which the laser beam travels across the surface of the marking material can range from 1 to about 100 inches/minute (up to about 250 cm/minute), alternatively from about 1 or 2 to about 20 inches/minute (about 2.5 or 5 to 50 cm/minute) for most thicknesses and compositions of marking material. The laser beam may be projected with a seam overlap of 1 to 100 percent, alternatively from about 10 to about 90 percent for many applications. The laser parameters are controlled in order to provide sufficient localized heating of the marking material while avoiding unwanted damage to the substrate.

Once the marking composition is disposed on a portion of the substrate, the beam emanating from the radiant energy source impinges upon the marking material, which absorbs the radiant energy and increases to the required temperature. In absorbing the radiant energy, at least a portion of the marking material is excited, i.e. has its atoms or molecules raised to an excited state. [See Webster's Encyclopedic Unabridged Dictionary of the English Language (Portland House, New York, 1989), page 497.] Typically, a temperature of 200° to 1500° F. is reached in approximately one to two microseconds. Precise temperatures are controlled by the output power of the radiant energy source and the physical position of the marking material relative to the focal plane of the radiant energy beam and the speed with which the beam is moving. Once the required temperature is achieved, the marking material and substrate will permanently bond together to form a new marking layer atop the substrate. Marking materials can be formulated to absorb specific amounts of a specified wavelength of the radiant energy.

The permanent markings produced in accordance with the present subject matter have a thickness of from 0 to about 100 microns as measured from the surface of the substrate. In another aspect, the thickness is from about 0.05 to about 30 microns. In one aspect, substantially no indention or removal of the substrate is observed. In the case of glass substrates, it is preferable to avoid removal of the glass because indentations tend to weaken the glass substrate.

Upon irradiation, many different types of permanent marking compositions may be achieved in accordance with the present subject matter. Examples of permanent marking compositions include colored or colorless sintered glass frit, inorganic chromophores fused into the surface of the glass or metal substrate, a combination of the two, and metal oxide fused into the glass or metal surface or reacted with the substrate material. Because of the interaction with the marking material, the composition of the marking may depend on the composition of the substrate.

Several different methods are suitable for laser marking, for example: a) the mask method whereby the area to be marked is uniformly coated with the marking composition and the radiant energy passes through a fixed, data specific mask and impinges onto the marking composition to produce the desired mark; and b) the dot-matrix method whereby the area to be marked is uniformly coated with the marking composition and the radiant energy passes through a computer controlled, changeable data, dot-matrix mask and impinges onto the marking composition to produce the desired mark; and c) the beam deflection method whereby the area to be marked is uniformly coated with the marking composition and the radiant energy passes through a beam steering head and impinges onto the marking composition to produce the desired mark; and d) the X-Y plotter method whereby the area to be marked is uniformly coated with the marking composition and the radiant energy moves on a gantry type X-Y mechanism utilizing mirrors and/or fiber-optics and impinges onto the marking composition to produce the desired mark; and e) the part moving method whereby the area to be marked is uniformly coated with the marking composition and the workpiece to be marked is moved using an X-Y motor driven stage under a stationary beam which impinges onto the marking composition to produce the desired mark; and f) the area irradiation method whereby data specific marking composition is uniformly applied to the surface of the workpiece and the data specific marking area is irradiated by means of a beam steering mechanism or by means of moving the workpiece under a stationary beam. In methods b), c), d), e) and f) the laser can be combined with a laser marking system so that the marking composition can be irradiated with any computer programmed digits, letters and special symbols where the laser beam strikes the marking composition in the most efficient manner possible.

The laser beam, the movement of which can be controlled by a computer, may be used to create discrete symbols or designs or, alternatively, may be serially indexed across the surface of the marking material to create multiple symbols or designs at the same time. For example, a word may be created by separately making each letter of the word with the laser, or by rastering the laser across the entire word to form all of the letters at the same time.

During the irradiation step, the surface of the substrate may be exposed to any desired type of atmosphere. For example, the atmosphere may comprise air at atmospheric, sub-atmospheric or super-atmospheric pressures. Furthermore, the atmosphere may comprise an inert gas such as nitrogen, argon or carbon dioxide, an oxidizing atmosphere such as air or oxygen, a reducing atmosphere such as hydrogen or carbon monoxide, or a vacuum.

Oxidizing or reducing gases can be used in a combination with inert gases. It is also possible to control the atmosphere on the surface of the substrate through the type of media the marking material is dispersed in. The atmosphere to which the surface of the substrate is exposed may affect the color and the quality of the mark. A single laser beam may be used for marking in accordance with the present subject matter. Alternatively, two or more laser beams may be used. For example, a first laser beam may be used to preheat the marking material and substrate, followed by a second laser which is used to adhere the marking material to the preheated substrate. This is particularly advantageous for marking glass because preheating may help to reduce internal stress and micro-cracking that can result from the laser marking operation.

Removal of Excess

The present subject matter methods involve removing the excess marking composition from the substrate. Excess material not bonded to the substrate surface can be removed by conventional cleaning processes. In high-volume applications, the unused marking composition can be recovered from the cleaning process and reused.

Removal of excess marking material is accomplished depending on the form and application technique employed to deliver and apply the marking composition. For example, if the marking composition was in powder form, the excess powder that was not subject to laser irradiation can be removed by wiping, dusting, washing, brushing off, vacuuming, subliming or blowing off the substrate, or the like. On the other hand, if the article used to apply the marking composition was a tape carrier, then the portion of the tape that was not irradiated by the laser can be peeled from the substrate. The irradiated portion of the marking compositions remains adhered to the substrate forming a permanent mark.

The present subject matter methods enable formation of high contrast or dark marks on a portion of a substrate. High-contrast marks or dark marks, for the purposes of this disclosure, means marks that are visible to the human eye, and/or machine readable, and are darker than the surrounding material. For example, a high-contrast or dark mark may appear on a transparent substrate to be a black, brown, purple, blue, green or other high-contrast, dark or colored mark.

After formation of a coating of the composition on the surface of interest, the coating and underlying surface is selectively irradiated with the noted source of energy, which in one embodiment comprises a laser. The term "selective irradiating" refers to directing laser energy to only particular localized regions of the coating and underlying surface. These regions correspond to the shape and outline of the desired marks. The laser is operated as previously described, i.e. at the noted power levels and speeds. The distance of the laser source from the surface to be marked varies depending upon the focal length of the laser beam. Typically, one or more lenses can be used to focus the laser beam at 1.5, 2, and 4 inches from the surface for example. For many marking applications, a distance of about 1.5 inches between the lens and the surface to be marked is appropriate for a $CO_2$ laser as described herein.

As previously explained, and although not wishing to be bound to any particular theory, it is believed that exposure to relatively high laser energy results in the marking composition(s) increasing in temperature. Use of relatively small particulates also increases the overall surface area of the particulates and thereby increases the extent of energy absorption. Furthermore, reducing particle size increases the ratio of surface area to mass for a given particle. Particles having high ratios of surface area to particle mass can be heated faster and thus exhibit quicker temperature increases upon exposure to laser energy as compared to larger particles having reduced ratios of surface area to mass.

Use of and/or the combination of different compositions of marking composition, second and/or subsequent applications of marking composition and/or the adjustment of laser parameters will result in variations in the durability, appearance, and structural form of the resulting mark. Thus, a person skilled in the art of laser marking can create a wide variety of marking characteristics to suit his requirements. All of these marking characteristics can be achieved with the use of a single low-power, low-cost air-cooled diode laser. Furthermore, an infinite variety of colors can be achieved.

Various types of marks may be produced in accordance with the present subject matter. For example, the marks may comprise alphanumeric symbols, graphics, logos, designs, decorations, serializations, bar codes, two dimensional matrices and the like. In addition, the markings may comprise three-dimensional lines forming patterns suitable for use in plasma display TV screens, fresnel lenses, polarizing filters, conductive circuits and the like.

In accordance with the present subject matter, permanent markings are formed with high contrast and high resolution. Resolution of the mark is determined by the size of the laser beam and the particle size of the marking material. Luminance contrast of the mark from the substrate is typically determined by particle size along with the laser beam energy, marking material and atmosphere in which the marking is carried out.

In addition, the present markings have favorable wear, corrosion and fade resistance properties that are determined by the marking material and marking parameters. For example, marks created with glass frits have wear, corrosion and fade resistance properties similar to the resistance of the glass from which the frit was made.

Furthermore, by using conventional laser controlled hardware and software, the markings of the present subject matter may be quickly varied from operation to operation for applications such as serialization, bars codes, manufacturing quality control and automated manufacturing.

Evaluations

A series of investigations was conducted in which the contrast of marks formed using a laser marking method was measured as particle size in the marking compositions was varied.

Example 1

In a first investigation, various marking compositions comprising absorber particles of a molybdenum compound, a phyllosilicate, and a vanadium compound dispersed in ethanol were prepared. Five compositions designated as compositions A-E were formed, in which all compositions were identical but for the mean particle size of the molybdenum compound, the phylloslicate, and the vanadium compound. Particle size was reducing by milling the particles on a high speed mill using 1/16 inch zirconium beads for progressively longer time periods and measured with a Horiba LA-910 laser scattering particle size distribution analyzer from Horiba Scientific, 3880 Park Avenue, Edison, N.J. 08820-3097. The mean particle size is the average size of all of the particles of the molybdenum compound, the phylloslicate, and the vanadium compound. Specifically, Table 2 lists the mean particle size and the corresponding mill time for each composition:

TABLE 2

Metal System Mean Particle Sizes and Mill Times

| Composition | Mean Particle Size (μm) | Mill Time (minutes) |
|---|---|---|
| A | 8.4 | — |
| B | 6.2 | 20 |
| C | 3.8 | 60 |
| D | 2.2 | 80 |
| E | 1.2 | 120 |

After particle size reduction, the compositions A-E were prepared and then used in laser marking methods. Specifically, a stainless steel substrate was marked using compositions A-E and a non-pulsed 10 watt fiber laser. The contrast of the resulting marks was measured using a colorimeter and CIE 10 degree illuminant with D65 gloss included. Table 3 set forth below lists the measured contrast of each mark. The lower the L value, the greater the contrast.

TABLE 3

Contrast of Metal System Marks

| Composition | L Value | ΔL from composition A |
|---|---|---|
| A | 30.4 | |
| B | 29.7 | −0.70 |
| C | 40.9 | 10.5 |
| D | 43.2 | 12.8 |
| E | 38.3 | 7.9 |

As shown in Table 3, composition B exhibited the greatest contrast (darkest mark) using absorber particles in the laser marking composition having a mean particle size of 6.2 microns. Composition A, having a mean particle size of 8.4 microns, also provided marks with excellent contrast. Based upon this data and the descriptions provided herein, it is believed that excellent high contrast marks can be produced using a non-pulsed 10 watt fiber laser with marking compositions having a mean absorber particle size of from about 5 microns to about 10 microns.

Example 2

In another investigation, marking compositions comprising particles of a molybdenum compound, a phyllosilicate, and a vanadium compound dispersed in ethanol were prepared. Five compositions designated as F-J were formed, in which all compositions were identical but for the mean particle size of the three populations of absorber particles. Particle size was reduced by milling the particles on a high speed mill using 1/16 inch zirconium beads for progressively longer time periods. Specifically, Table 4 lists the mean particle size and the corresponding mill time for each of the compositions:

TABLE 4

Metal System Mean Particle Sizes and Mill Times

| Composition | Mean Particle Size (μm) | Mill Time (minutes) |
|---|---|---|
| F | 8.4 | — |
| G | 6.2 | 20 |
| H | 3.8 | 60 |
| I | 2.2 | 80 |
| J | 1.2 | 120 |

After particle size reduction, the compositions F-J were prepared and then used in laser marking methods. Specifically, a stainless steel substrate was marked using compositions F-J and a 40 watt $CO_2$ laser. The contrast of the resulting marks was measured using a colorimeter and CIE 10 degree illuminant with D65 gloss included. Table 5 set forth below, lists the measured contrast of each mark. The lower the L value, the greater the contrast.

TABLE 5

Contrast of Metal System Marks

| Composition | L Value | ΔL from composition F |
|---|---|---|
| F | 36.7 | |
| G | 37.8 | 1.1 |
| H | 39.3 | 2.6 |
| I | 37.0 | 0.3 |
| J | 36.8 | 0.1 |

As shown in Table 5, compositions F exhibited the greatest mark contrast using absorber particles in the laser marking composition having a mean particle size of 8.4 microns, when using a 40 watt $CO_2$ laser. However, based upon this data and the descriptions herein, it is believed that high contrast marks can be produced using a 40 watt $CO_2$ laser with marking compositions having a mean absorber particle size of from about 1 to about 10 microns.

Example 3

In another investigation, various marking compositions comprising absorber particles of a complex inorganic compound, a zirconium compound, and a silicon compound dispersed in a solvent or carrier. The compositions were identical but for the average size of the absorber particles in each composition.

TABLE 6

Ceramic System Mean Particle Sizes

| Composition | Mean Particle Size (μm) |
| --- | --- |
| K | 4.51 |
| L | 0.82 |
| M | 1.18 |
| N | 2.2 |
| O | 3.67 |
| P | 4.51 |
| Q | 0.82 |
| R | 1.18 |
| S | 2.2 |
| T | 3.67 |

Each composition was used in laser marking a white ceramic substrate using either a 10 watt fiber laser or a 30 watt $CO_2$ laser. After formation of various marks, contrast was measured as reported in Tables 7A and 7B below.

TABLE 7A

Color Properties of Ceramic Marks Using 10 Watt Fiber Laser

| Composition | L | a | b | ΔL* | Δa* | Δb* | ΔE* |
| --- | --- | --- | --- | --- | --- | --- | --- |
| K | 68.78 | −1.7 | −0.37 | | | | |
| L | 67.75 | −1.9 | −0.57 | −1.03 | −0.2 | −0.2 | 1.07 |
| M | 67.42 | −1.83 | −0.40 | −1.36 | −0.13 | −0.03 | 1.37 |
| N | 69.17 | −1.72 | −0.13 | 0.39 | −0.02 | 0.24 | 0.46 |
| O | 68.93 | −1.65 | −0.37 | 0.15 | 0.05 | 0 | 0.15 |

*from composition K.

TABLE 7B

Color Properties of Ceramic Marks Using 30 Watt $CO_2$ Laser

| Composition | L | a | b | ΔL* | Δa* | Δb* | ΔE* |
| --- | --- | --- | --- | --- | --- | --- | --- |
| P | 73.78 | −1.60 | −4.88 | | | | |
| Q | 75.46 | −1.49 | −5.05 | 1.68 | 0.11 | −0.17 | 1.69 |
| R | 74.47 | −1.52 | −5.03 | 0.69 | 0.08 | −0.15 | 0.71 |
| S | 73.43 | −1.55 | −4.92 | −0.35 | 0.05 | −0.04 | 0.35 |
| T | 74.54 | −1.52 | −4.81 | 0.76 | 0.08 | 0.07 | 0.77 |

*from composition P

As demonstrated in the results set forth above in Tables 7A, when using a 10 watt non-pulsed fiber laser, the marking composition becomes darker with absorber particle size reduction while a and b color values remain constant between the different compositions at an optimum particle size range. The contrast is provided by the marks becoming more opaque and masking the white ceramic tile substrate. The optimum mean absorber particle size is from about 2.22 microns to about 3.67 microns, for compositions N and O for this ceramic glaze system.

As demonstrated in the results set forth above in Tables 7B, when using a 30 watt $CO_2$ laser, the optimum mean absorber particle size is from about 1.18 microns to about 3.67 microns for this ceramic glaze system since opacity and color values are the most important variables when measuring contrast with a ceramic substrate. This range for the absorber particle size corresponds to compositions R, S and T for this ceramic marking composition.

Example 4

In still another investigation, various marking compositions were prepared with absorber particles comprising a complex inorganic compound, a zirconium compound, a silicon compound, and a calcium compound dispersed in a solvent or carrier. The compositions were identical but for the average size of the absorber particles in each composition. The compositions were applied to a glass substrate and then laser marked using either a 10 watt fiber laser or a 35 watt $CO_2$ laser. After marking, the marked samples were then read on a spectrophotometer over a white Leneta card. The tables below show that the markings become lighter or more transparent as the absorber particle size is reduced while using the $CO_2$ and fiber lasers. Transparency, translucency and opacity depend on an optimum absorber particle size. As the absorber particle size is reduced the laser marked surface becomes more transparent and lighter.

TABLE 8A

Contrast of Glass System Marks Using 10 Watt Fiber Laser

| Mean Particle Size (μm) Standard: 5.4 | ΔL* | Δa* | Δb* | ΔE* |
| --- | --- | --- | --- | --- |
| 4.4 | −0.01 | −0.10 | −0.16 | 0.19 |
| 3.4 | 1.45 | −0.33 | −0.20 | 1.50 |
| 1.6 | 2.46 | −0.25 | 0.40 | 2.50 |

*from the standard.

TABLE 8B

Contrast of Glass System Marks Using 35 Watt $CO_2$ Laser

| Mean Particle Size (μm) Standard: 5.4 | ΔL* | Δa* | Δb* | ΔE* |
| --- | --- | --- | --- | --- |
| 4.4 | −0.33 | −0.02 | −0.01 | 0.33 |
| 3.4 | 0.14 | 0.24 | −0.30 | 0.41 |
| 1.6 | 1.36 | 0.36 | 0.84 | 1.64 |

*from the standard.

For laser marking on certain glass substrates, the resulting mark may need to be opaque for one application, while another glass application may require transparency or translucency when laser marked to show a certain effect through the glass. By optimizing the absorber particle size the transparency, translucency and opacity of the finished laser marked sample is affected. Using the non-pulsed 10 watt fiber laser the optimum mean absorber particle size for this glass system is from about 4.4 microns to about 5.4 microns. Utilizing the 35 watt $CO_2$ laser the optimum particle size for this glass system is from about 3.4 microns to about 5.4 microns.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previous type devices. However, it will be appreciated that various changes in the details, materials and arrangements of parts, which have been herein described and illustrated in order to explain the nature of the present subject matter, may be made by those skilled in the art without departing from the principle and scope of the present subject matter, as expressed in the appended claims.

What is claimed is:

1. A composition for forming marks or indicia on a glass substrate upon laser irradiation, the composition comprising:
   at least one carrier selected from the group consisting of aqueous-based liquids, organic solvents, and combinations thereof;
   an absorber compound selected from the group consisting of complex inorganic compounds, zirconium compounds, silicon compounds, calcium compounds and combinations thereof; and
   wherein the absorber compound has an average particle size from about 0.1 microns to about 10 microns,
   wherein upon disposing the composition on a glass substrate and exposing the composition to laser light, the composition absorbs radiant energy, increases in temperature, chemically bonds with the glass substrate, and forms a mark having a luminance, color value, or degrees of opacity that provides visual contrast with the glass substrate.

2. The composition of claim 1, wherein the absorber compound has an average particle size from about 4 microns to about 6 microns.

3. A composition for forming marks or indicia on a ceramic substrate upon laser irradiation, the composition comprising:
   at least one carrier selected from the group consisting of aqueous-based liquids, organic solvents, and combinations thereof;
   an absorber compound selected from the group consisting of complex inorganic compounds, zirconium compounds, silicon compounds, and combinations thereof; and
   wherein the absorber compound has an average particle size from about 0.1 microns to about 10.0 microns,
   wherein upon disposing the composition on a ceramic substrate and exposing the composition to laser light, the composition absorbs radiant energy, increases in temperature, chemically bonds with the ceramic substrate, and forms a mark having a luminance, color value, or degrees of opacity that provides visual contrast with the ceramic substrate.

4. The composition of claim 3, wherein the absorber compound has an average particle size of from about 0.8 microns to about 5 microns.

5. The composition of claim 3, further comprising additional components selected from the group consisting of complex inorganic metal oxides, metal oxide opacifiers, glass frits, glass frit precursors, and combinations thereof.

6. The composition of claim 5, wherein the composition comprises:
   from about 10 wt % to about 40 wt % of the glass frits;
   from about 10 wt % to about 50 wt % of the complex inorganic metal oxides;
   from about 3 wt % to about 15 wt % of the metal oxide opacifiers; and
   from about 25 wt % to about 45 wt % of the at least one carrier.

7. The composition of claim 5, wherein the composition comprises complex inorganic metal oxides, wherein the complex inorganic metal oxides are selected from the group consisting of complex inorganic blue metal oxides, complex inorganic black metal oxides, complex inorganic red metal oxides, complex inorganic yellow metal oxides, complex inorganic green metal oxides, complex inorganic brown metal oxides, complex inorganic orange metal oxides, and combinations thereof.

8. The composition of claim 5, wherein the composition comprises at least one glass frit, wherein the at least one glass frit comprises at least one selected from the group consisting of alkali metal oxides, alkaline earth metal oxides, silica, boric oxide, transition metal oxides, and combinations thereof.

9. The composition of claim 5, wherein the composition comprises at least one glass frit precursor, wherein the at least one glass frit precursor comprises metal oxides and glass formers selected from the group consisting of silica, zinc oxide, bismuth oxide, sodium borate, sodium carbonate, feldspars, fluorides and combinations thereof.

10. A composition for forming marks or indicia on a metal substrate upon laser irradiation, the composition comprising:
    at least one carrier selected from the group consisting of aqueous-based liquids, organic solvents, and combinations thereof;
    an absorber compound selected from the group consisting of molybdenum compounds, vanadium compounds, silicon compounds, and combinations thereof; and
    wherein the absorber compound has an average particle size from about 0.1 microns to about 10.0 microns,
    wherein upon disposing the composition on a metal substrate and exposing the composition to laser light, the composition absorbs radiant energy, increases in temperature, chemically bonds with the metal substrate, and forms a mark having a luminance, color value, or degrees of opacity that provides visual contrast with the metal substrate.

11. The composition of claim 10, wherein the average particle size of the absorber compound is from about 5 microns to about 10 microns.

12. The composition of claim 10, wherein the composition comprises:
    from about 10 wt % to about 50 wt % of the molybdenum compounds;
    from about 5 wt % to about 25 wt % of the vanadium compounds; and
    from about 3 wt % to about 20 wt % of the silicon compounds.

13. The composition of claim 10, wherein the at least one carrier is selected from the group consisting of water, alcohols, organic solvents, alkanes, polyols, chlorinated solvents, amines, esters, glycol ethers, ketones, terpenes, petroleum naphthas, aromatic hydrocarbons, xylenes, natural oils, furans, isoparaffins, N,N dimethylformamide, dimethylsulfoxide, tributylphosphine, and combinations thereof.

14. The composition of claim 1, wherein the absorber compound comprises:

from about 10 wt % to about 50 wt % of the complex inorganic compounds;

from about 5 wt % to about 30 wt % of the zirconium compounds;

from about 5 wt % to about 25 wt % of the silicon compounds; and from about 5 wt % to about 25 wt % of the calcium compounds.

15. The composition of claim 3, wherein the composition comprises:

from about 10 wt % to about 50 wt % of the complex inorganic compounds;

from about 5 wt % to about 30 wt % of the zirconium compounds; and from about 5 wt % to about 25 wt % of the silicon compounds.

* * * * *